Patented Sept. 20, 1932

1,878,593

UNITED STATES PATENT OFFICE

RUDOLF MEINGAST AND MARTIN MUGDAN, OF MUNICH, GERMANY, ASSIGNORS TO CONSORTIUM FUER ELEKTROCHEMISCHE INDUSTRIE, OF MUNICH, GERMANY

PROCESS OF MANUFACTURING ACETIC ANHYDRIDE

No Drawing. Application filed June 2, 1927, Serial No. 196,137, and in Germany June 17, 1926.

This application is an improvement of our U. S. Patent No. 1,570,514. In this patent we have disclosed the formation of acetic anhydride from acetic acid by passing the acid over a catalyst and at temperatures from 400 to 800° C. The amount of heat required for this process is very great and the capacity of an equipment for carrying it out is limited to a considerable extent by the rate at which heat may be transferred to the reaction chamber and from the reaction chamber to the reaction materials. We have found that a very considerable portion of this heat is used in the vaporization of the acetic acid, in the change from dimolecular to monomolecular acetic acid and in raising its temperature.

We have now discovered that by using suitable preheaters we are able to greately increase the capacity of a given piece of equipment. Thus, if the acetic acid is vaporized and heated by passing it thru tubes of suitable materials maintained at say 400–800° C., preferably at 700° C., and is then passed in contact with a dehydrating catalyst e. g. thru a mass of molten alkali phosphate as disclosed in our Patent #1,636,701, granted July 26, 1926, it is possible to obtain good yields of acetic anhydride with a velocity of the order of ten times that which was feasible without such preheating. As suitable materials for such tubes may be mentioned the glass, quartz or silver tubes disclosed in U. S. Patent No. 1,570,514 or preferably tubes made of or lined with the materials described in our other application S. N. 196,136 of June 2, 1927: copper, bronze, the acid resisting chromium-iron alloys, such as "Duraloy" of the Duraloy Co., Pittsburgh, containing about 30% chromium, trace of silicon and carbon, and iron by difference, the alloys "V2A" containing 20% chromium, 7% nickel, .25% carbon, iron by difference, "VM" and "Nichrotherm", similar steel alloys having from 10–25% chromium and from 4–10% nickel, iron by difference, made by Friedrich Krupp in Essen, Germany, Some acetic anhydride is formed as the acetic acid passes thru these tubes, but the most economical design of preheating and of contact vessel is one which the acetic acid will traverse at so high a speed that but little anhydride is formed in the tubes, and in which the main dehydration reaction takes place in the catalyst space.

A suitable installation would consist e. g. of a preheating tube connected to a reaction space comprising for example a mass of catalyst preferably a phosphate disposed on a suitable carrier or comprising a graphite vessel containing molten alkali phosphate thru which the acetic acid vapors would be made to pass. The whole may be heated if desired by gas, the flames first passing over or around the reaction vessel and then over the preheater. After the reaction products have left the reaction space they should be cooled, and the acetic anhydride containing liquid condensed.

The heat of the gases issuing from the reaction vessel may also be utilized for the preheating.

In order to more clearly define our invention we append the following examples.

Example I 100 kilos acetic acid vapor per hour are led through a coil fabricated from, for example, the chrome-nickel-steel V 2 A made by Krupp in Essen. The coil which has a heating surface of about 2 square meters is heated by oil firing up to say 600° C. From the coil the vapor is led into a graphite crucible which contains several kilos of molten sodium-lithium metaphosphate as described in our Patent No. 1,636,701, dated July 26, 1926, maintained at a temperature of 400–800° C., preferably at 700° C. The vapor issuing from the kettle is immediately cooled down. The condensed product contains more than 35 per cent acetic anhydride.

Example II

Acetic acid vapor preheated up to 600° C. in the same way as in Example I is led thru a chrome-nickel-tube of 150 mm. diameter and 2 m. length filled with pieces of carborundum covered with metaphosphate of aluminium. The chrome-nickel-tube is heated electrically to 700° C. The vapor issuing from the catalyzing tube contains likewise 35 per cent acetic anhydride.

*Example III*

The preheating of the acetic acid vapor is performed in a copper coil of 2 square meters heating surface, heated by electric resistances. The preheated acetic acid is split in anhydride and water like in Example I or II.

*Example IV*

The preheating of the acetic acid vapor is performed by leading it thru a heating chamber containing electrically heated bands of nickel-chromium-steel "Nichrotherm 3" of the firm Friedrich Krupp in Essen. The preheated acetic acid vapor is then led over a heated contact.

By the term "without substantial decomposition," as used in the claims, is meant without substantial decomposition of acetic acid vapour into products other than acetic anhydride and water. In other words the term "decomposition" is not intended to include the simple dehydration of acetic acid whereby acetic anhydride is formed.

What we claim is:

1. The process of preparing acetic anhydride comprising preheating acetic acid vapor without substantial decomposition thereof to 400–800° C. and then passing the vapor in contact with a dehydrating catalyst at 400° C. to 800° C.

2. The process of preparing acetic anhydride comprising preheating acetic acid vapor without substantial decomposition thereof to 400–800° C. in contact with a metal surface comprising a chromium-iron alloy which does not decompose acetic acid under the conditions obtaining and then passing the vapor in contact with a dehydrating catalyst at 400° C. to 800° C.

3. The process of preparing acetic anhydride comprising preheating acetic acid vapor without substantial decomposition thereof to 400–800° C. and then passing the vapor in contact with a metal phosphate at 400–800° C.

4. The process of preparing acetic anhydride comprising preheating acetic acid vapor without substantial decomposition thereof to 400–800° C. in contact with a metal surface comprising a chromium-iron alloy which does not decompose acetic acid under the conditions obtaining and then passing the vapor in contact with a metal phosphate at 400–800° C.

5. The process of preparing acetic anhydride comprising preheating acetic acid vapor without substantial decomposition thereof to 400–800° C. and then passing the vapor in contact with an alkali metal phosphate at 400–800° C.

6. The process of preparing acetic anhydride comprising preheating acetic acid vapor without substantial decomposition thereof to 400–800° C. in contact with a metal surface comprising a chromium-iron alloy which does not decompose acetic acid under the conditions obtaining and then passing the vapor in contact with an alkali metal phosphate at 400–800° C.

7. The process of preparing acetic anhydride comprising preheating acetic acid vapor without substantial decomposition thereof to 400–800° C. and then passing the vapor through molten alkali metal phosphate at 400–800° C.

8. The process of preparing acetic anhydride comprising a preheating acetic acid vapor without substantial decomposition thereof to 400–800° C. in contact with a metal surface comprising a chromium-iron alloy which does not decompose acetic acid under the conditions obtaining and then passing the vapor through molten alkali metal phosphate at 400–800° C.

RUDOLF MEINGAST.
MARTIN MUGDAN.